Jan. 24, 1939.　　M. PUCCETTI　　2,145,129
CORK REMOVER
Filed April 7, 1938
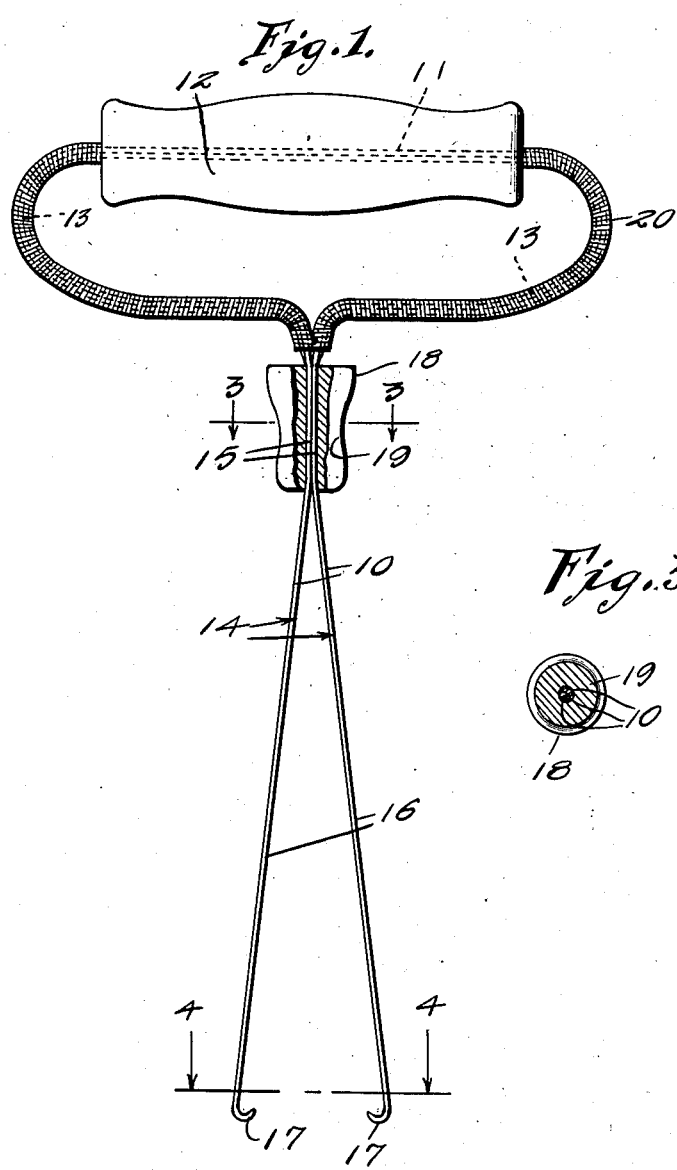
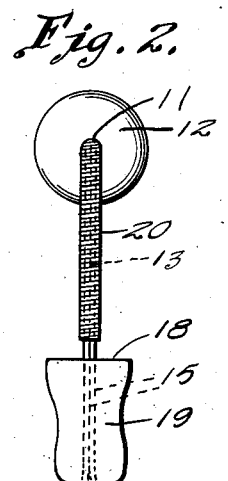
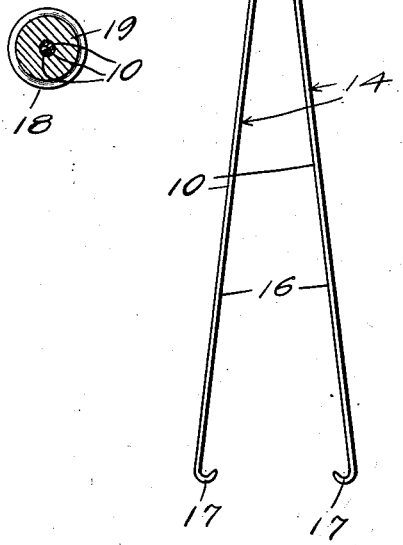
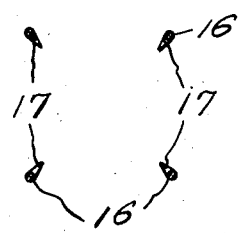
Inventor
Moses Puccetti
By L. F. Randolph
Attorney Patented Jan. 24, 1939

2,145,129

UNITED STATES PATENT OFFICE 2,145,129

CORK REMOVER

Moses Puccetti, Kelseyville, Calif.

Application April 7, 1938, Serial No. 200,799

3 Claims. (Cl. 65—47)

This invention relates to a cork remover and aims to provide a novel construction which will remove corks from the usual sealing position in a bottle and also when displaced inside of the bottle, with equal facility.

It is further aimed to provide a novel structure made primarily from resilient wires or arms, having a handle, reinforcing means for the wires or arms and a follower movable along the wires or arms and for which the reinforcing means constitutes an abutment.

The more specific objects and advantages will become apparent from a consideration of the description following taken in connection with accompanying drawing illustrating an operative embodiment.

In said drawing:—

Figure 1 is a view in front elevation, partly broken away, showing the improved cork extractor;

Figure 2 is an elevation taken at a right angle to Figure 1;

Figure 3 is a horizontal section taken on the plane of line 3—3 of Figure 1, and Figure 4 is a horizontal section taken on the plane of line 4—4 of Figure 1.

Referring specifically to the drawing wherein like reference characters designate like or similar parts, the extractor is made from a plurality, for instance four as specifically shown, metallic and preferably steel wires or strands 10. Such strands are threaded or passed through a central opening 11 of a handle 12 of wood or any other suitable material. Beyond the ends of the handle 12, the wires 10 are looped and returned toward each other as at 13 and are then formed into terminally free arms or tines 14, having parallel contiguous portions 15 and diverging elongated portions 16 forming the extractor arms and which terminate at their free ends in inwardly extending hooks 17.

Movable along the arms 14 is a follower 18 of wood, rubber or any other suitable material, which is preferably reduced intermediate its ends as at 19 to facilitate gripping by the fingers, without danger of slippage of the fingers in either longitudinal direction.

Portions 13 are reinforced in any suitable manner as by coiling wires 20 around the same, or the wires 20 may be coil springs. Such reinforcements 20 terminate relatively close to the portions 15 and they constitute an abutment for the follower 18, limiting its movement to normal position.

In the use of the cork remover, the free ends of the tines 16 will be disposed in the neck of the bottle, between the wall thereof and the cork, with the hooks 17 extending into the cork. The follower 18 may be depressed or moved so as to force the hooks 17 effectively into the cork and maintain them in such position while the handle 12 is pulled or withdrawn to remove the cork, following which, the follower may be restored to normal position, permitting expansion of the arms or tines 14 and consequent release of the cork.

Attention is called to the fact that the cork may be removed, if it should fall within the bottle, with equal facility to a cork in the normal sealing position, since the tines 16 are relatively long and will reach the cork and may be effectively engaged therewith at the hooks 17.

Various changes may be resorted to provided they fall within the spirit and scope of the invention.

I claim as my invention:—

1. A cork remover of the class described having a plurality of wire members in bunched relation intermediate their ends and looped to form a handle, a handle member on the handle, arms at each extremity of the wires extending away from the handle, said arms having cork-engaging hooks, a follower movable along the arms, said arms having portions in diverging relation and portions in parallelism, the follower being normally engaged with the latter portions, and reinforcements surrounding the handle between said handle member and follower.

2. A cork remover of the class described having a plurality of wire members in bunched relation intermediate their ends and looped to form a handle, arms at each extremity of the wires extending away from the handle, said arms having cork-engaging hooks, a follower movable along the arms, a handle member through which the wires pass intermediate their ends and reinforcements surrounding the handle between said handle member and follower.

3. A cork remover of the class described having a plurality of wire members in bunched relation intermediate their ends and looped to form a handle, arms at each extremity of the wires extending away from the handle, said arms having cork-engaging hooks, a follower movable along the arms, a handle member through which the wires pass intermediate their ends, reinforcements surrounding the wires at opposite ends of the handle, and said follower being adapted to abut said reinforcements in normal position.

MOSES PUCCETTI.